Sept. 29, 1931.  W. O. LYTLE  1,825,277
PROCESS OF CUTTING DISKS FROM GLASS PLATES
Filed Dec. 21, 1928

INVENTOR
Wm. O. Lytle
by James C. Bradery

Patented Sept. 29, 1931

1,825,277

UNITED STATES PATENT OFFICE

WILLIAM O. LYTLE, OF NEW KENSINGTON, PENNSYLVANIA, ASSIGNOR TO DUPLATE CORPORATION, A CORPORATION OF DELAWARE

PROCESS OF CUTTING DISKS FROM GLASS PLATES

Application filed December 21, 1928. Serial No. 327,691.

Figure 1:
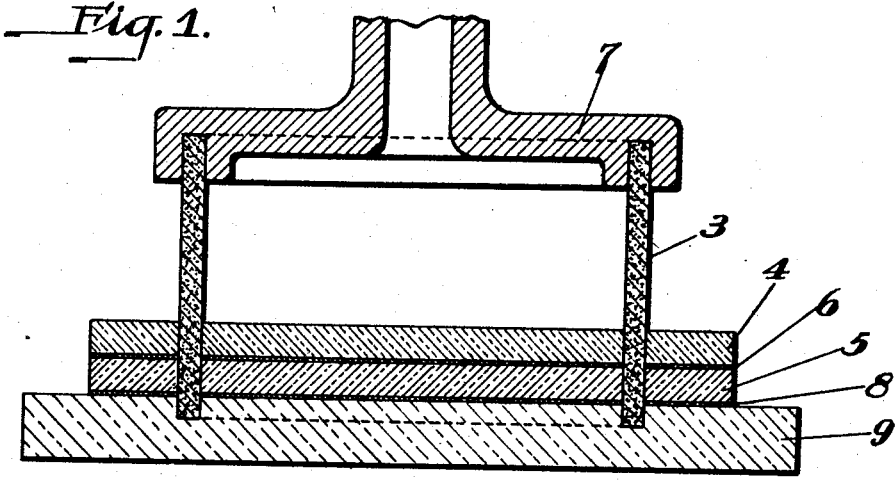

The invention relates to a process of cutting disks from glass plates, and particularly from what are known as composite glass plates, such plates comprising alternating sheets of glass and pyroxylin plastic; such as, celluloid and pyralin cemented together. Such sheets cannot be severed by scratching with a diamond or wheel, and then cracking off, as is the case with ordinary glass sheets, and the present process, which involves cutting by an abrading action which will sever the celluloid or pyralin as well as the glass, is particularly valuable in this connection. The invention has for its objects the provision of an improved process for cutting out glass disks rapidly and economically and without chipping the glass when the annular drill emerges from the glass on the lower side of the plate being cut. The process is illustrated in the accompanying drawings, wherein:

Figure 1 is a sectional view showing the process applied to the cutting of a single plate of composite glass. And Fig. 2 is a similar view showing the process as applied in its preferred form to the cutting of a plurality of plates of composite glass.

Referring to Fig. 1, 3 is an annular drill having an inside diameter equal to the diameter of the disks to be cut from the composite plate made up of the sheets of glass 4 and 5 cemented to the opposite sides of the sheet 6 of pyralin or other pyroxylin plastic. The upper edge of the drill is carried in any suitable holder, such as the member 7, such member being mounted on the spindle of a drill press or other suitable rotating means. Any suitable material may be used for the drill, such as bakelite mixed with granular carborundum, or a metal drill fed with abrasive, such as carborundum or steel and water.

To prevent chipping as the drill emerges from the bottom sheet of glass 5, the plate is secured by a suitable cement 8 to a sheet 9 of waste glass which is penetrated by the end of the drill as shown in Fig. 1. After the drilling is completed, the drill is withdrawn and the composite glass released from the cement 8. A convenient material to use as cement is ordinary paraffin, as this material holds with sufficient security and may be readily released by the application of heat. The use of the sheet 9 cemented to the sheet 5 insures against chipping and the edge of the disk thus cut out is relatively sharp and smooth.

Figure 2:
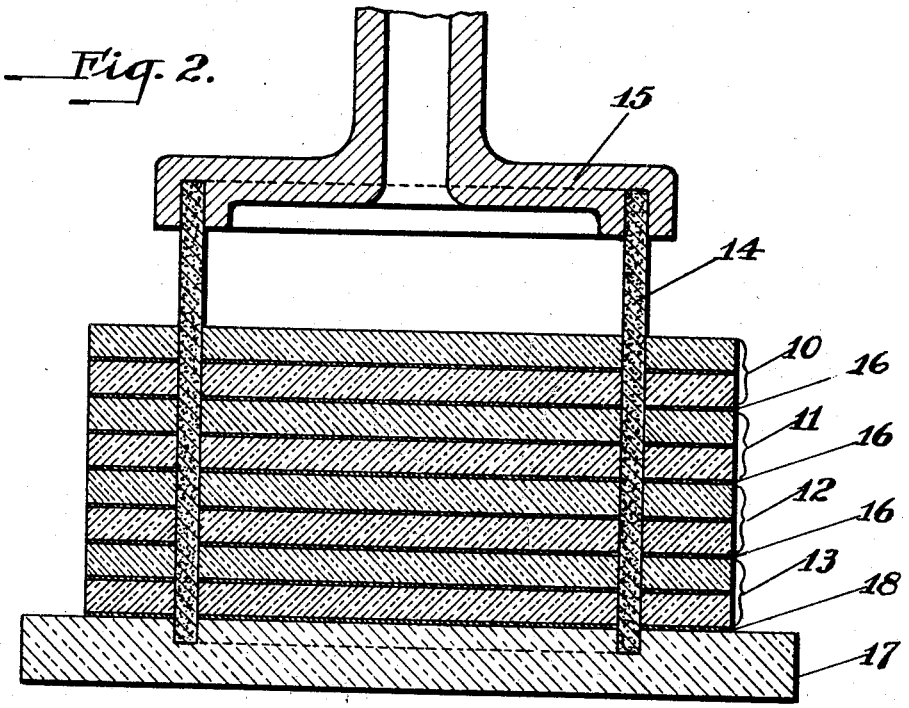

Fig. 2 illustrates the use of the process in its preferred form. Here a plurality of composite plates 10, 11, 12 and 13 are cut at one operation by the annular drill 14, provided with the holder 15. The successive plates are secured together by the layers 16, 16, 16 of paraffin acting as a cement and the bottom plate 13 is secured to the waste sheet 17 by means of the paraffin film or layer 18. In this manner each of the bottom sheets of glass of the various composite plates is protected against chipping, and the multiple cutting involves a substantial saving in time and labor. A large number of plates may be cut at one time and only one waste bottom sheet 17 is required for the series. The use of the paraffin layers 16, 16, 16, 18 also prevents the disks cut from the plates from rotating with the drill and being scratched. The process is further of value in any drilling apparatus as applied to glass sheets whether the object is to provide circular disks or merely to cut holes in the plates. In any case, the plate cemented to the bottom of the plate being drilled, prevents chipping when the annular drill emerges from the plate.

What I claim is:

A process of cutting a series of circular disks from a series of plates of glass, which consists in cementing the series of plates together in a pack, cementing the outer face of one of the outer sheets of the pack to another plate of glass which acts as a support for the pack, and then cutting through the pack from the side thereof remote from the supporting plate with an annular drill until the end of the drill penetrates such supporting plate.

In testimony whereof, I have hereunto subscribed my name this eighth day of December, 1928.

WILLIAM O. LYTLE.